United States Patent
Suzuki

(10) Patent No.: US 8,647,539 B2
(45) Date of Patent: Feb. 11, 2014

(54) PROCESS FOR PRODUCING A NEAR INFRARED CUT FILTER GLASS

(75) Inventor: Hidetoshi Suzuki, Haibara-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/617,315

(22) Filed: Sep. 14, 2012

(65) Prior Publication Data

US 2013/0069024 A1 Mar. 21, 2013

Related U.S. Application Data

(63) Continuation of application No. PCT/JP2011/057225, filed on Mar. 24, 2011.

(30) Foreign Application Priority Data

Mar. 26, 2010 (JP) .................................. 2010-072449

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *C03C 6/00* | (2006.01) |
| *C03C 6/02* | (2006.01) |

(52) U.S. Cl.
USPC ............... 252/587; 252/582; 501/27; 501/43; 501/45; 501/48; 501/904; 501/905

(58) Field of Classification Search
USPC ............ 252/582, 587; 501/27, 43, 45, 48, 76, 501/904, 905
See application file for complete search history.

(56) References Cited

U.S. PATENT DOCUMENTS 5,173,212 A * 12/1992 Speit et al. .............. 252/301.4 P

FOREIGN PATENT DOCUMENTS

| JP | 1-219037 | | 9/1989 | |
|---|---|---|---|---|
| JP | 02-217333 | * | 8/1990 | ................ C03C 4/08 |
| JP | 2-217333 | | 8/1990 | |
| JP | 3-83834 | | 4/1991 | |
| JP | 6-107428 | | 4/1994 | |
| JP | 10-194774 | * | 7/1998 | ................ C03C 4/08 |
| JP | 2008-001545 | * | 1/2008 | ................ C03C 4/08 |
| JP | 2008-001546 | * | 1/2008 | ................ C03C 4/08 |
| JP | 2008-1546 | | 1/2008 | |

OTHER PUBLICATIONS

International Search Report issued Jun. 14, 2011 in PCT/JP2011/057225 filed Mar. 24, 2011.

* cited by examiner

*Primary Examiner* — Bijan Ahvazi
(74) *Attorney, Agent, or Firm* — Oblon, Spivak, McClelland, Maier & Neustadt, L.L.P.

(57) ABSTRACT

The present invention provides a process for producing a near infrared cut filter glass by melting and forming a glass material blended; and from 0.1 to 5% as represented by mass percentage of an oxidant of at least of a nitrate compound, a sulfate compound, a peroxide, a perchlorate and chloric acid as well as a near infrared cut filter glass.

15 Claims, 1 Drawing Sheet

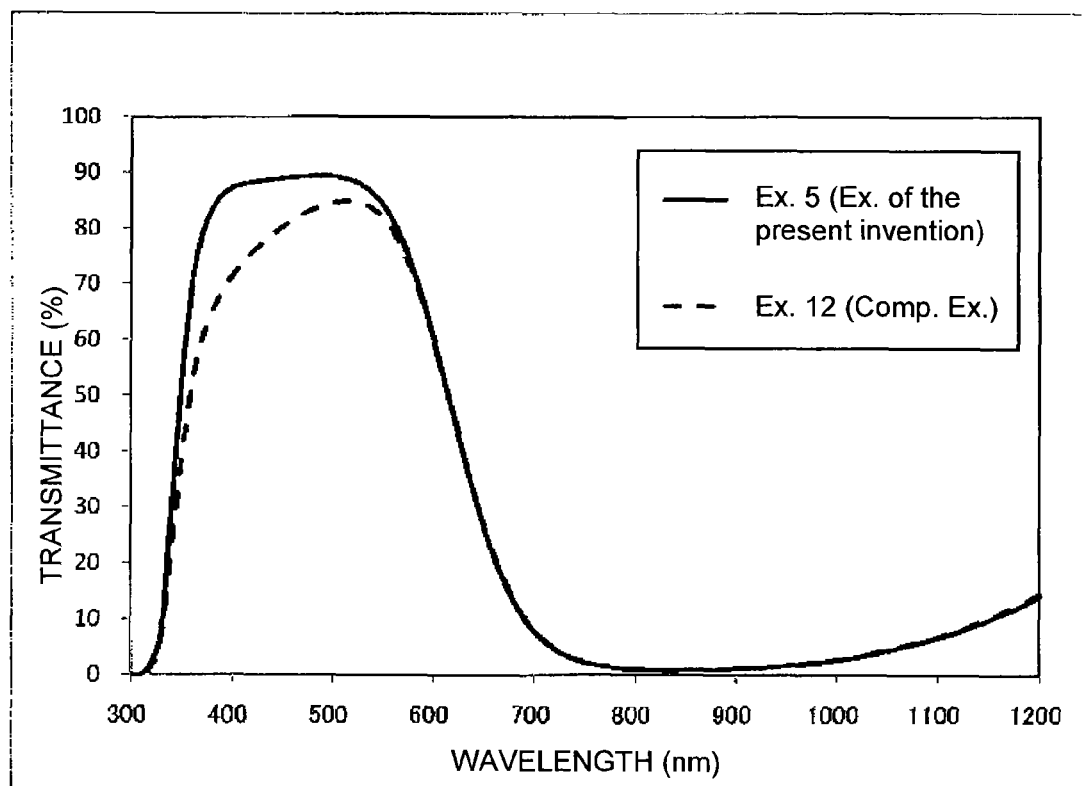

PROCESS FOR PRODUCING A NEAR INFRARED CUT FILTER GLASS

TECHNICAL FIELD

The present invention relates to a near infrared cut filter glass which is used as a luminosity factor correction filter for a digital still camera attached to a cellular phone or a compact type digital still camera, which efficiently transmits a visible light having a wavelength of from 400 to 600 nm, and which is excellent in a sharp cut characteristic of near infrared light in the vicinity of a wavelength of 700 nm, and to a process for producing such a near infrared cut filter glass.

BACKGROUND ART

A solid-state image-capturing element such as CCD or CMOS to be used for a digital still camera attached to a cellular phone or a compact type digital still camera, has a spectral sensitivity of from visible region to a near infrared region in the vicinity of 1,100 nm. Accordingly, it is not possible to obtain a good color reproducibility as it is, and it is necessary to correct the luminosity factor by a filter cutting light in the near infrared region.

Heretofore, for such a filter, a phosphate glass containing CuO as an additive for selectively absorbing near infrared wavelength, has been employed. Such a glass contains a large amount of $P_2O_5$ and contains CuO as an essential component, and a large number of $Cu^{2+}$ ions coordinated with oxygen ions are formed in an oxidating melting atmosphere, to show a blue green color, whereby the glass shows a near infrared cutting characteristics.

However, since a phosphate glass is insufficient in chemical durability (weather resistance), a weathering is formed on a polished glass surface, and it is difficult to use such a glass for a long time.

Accordingly, in order to improve chemical durability of phosphate glass, a fluorophosphates glass described in e.g. JP-A-1-219037 or JP-A-3-83834, that is produced by employing a fluorophosphate glass as a base glass and adding CuO to the base glass, has been developed.

PRIOR ART DOCUMENTS

Patent Documents

Patent Document 1: JP-A-1-219037
Patent Document 2: JP-A-3-83834

DISCLOSURE OF INVENTION

Technical Problem

Demand for reduction of the thicknesses of optical components of a digital still camera attached to the cellular phone or a compact type digital still camera, is increasing along with reduction of the thicknesses of main bodies. A near infrared cut filter is not an exception, and conventionally, a filter having a thickness of about 0.3 mm has been employed, but recently, a filter having a smaller thickness of about 0.15 mm is becoming to be used. Presently, a near infrared cut filter having a thickness of about 0.15 mm is usually produced by depositing a dielectric multilayer film on a glass of so-called white glass, and such a filter cuts near infrared rays by reflection.

As the thickness of the camera main body becomes smaller, the distance of an optical system from a lens to a light-receiving surface of a solid state image-capturing element becomes smaller, and as a result, an incident angle of light incident into the outer peripheral portion of a near infrared cut filter tends to be larger. In the case of reflection type near infrared cut filter, when the incident angle of light is large, reflection characteristics tend to shift to longer wavelength side, whereby a problem that an image in the outer peripheral portion where the incident angle of light becomes large tends to have a color tone different from one that is supposed to be (this tendency becomes remarkable from the vicinity of an incident angle of 25°). On the other hand, in a case of near infrared cut filter glass containing CuO, since near infrared rays are cut by absorption, the above problem of incident angle of light does not occur.

However, in the case of absorption type near infrared cut filter, in order to develop a sufficient near infrared cutting characteristics with a filter thickness of about 0.15 mm, it is necessary for the glass to contain a high concentration of CuO. However, when the content of CuO in the above fluorophosphates glass increases, the concentration of $Cu^+$ ions having an absorption wavelength in the vicinity of from 300 to 600 nm in the glass increases, which causes a problem that the spectral transmittance in a visible region of from 400 to 500 nm decreases and the glass tends to be green, whereby transmitting characteristic in visible region is inevitably deteriorated.

The present invention has been made under the circumstances, and it is an object of the present invention to provide a near infrared cut filter glass which efficiently transmits light in a visible region of from 400 to 600 nm even when the glass contains a large concentration of CuO since $Cu^+$ ion concentration in the glass is controlled, and which is thereby applicable to a filter having a small thickness of about 0.15 mm.

Solution to Problem

The present invention is characterized by a process for producing a near infrared cut filter glass, which comprises melting and forming a glass material blended as follows as represented by mass percentage calculated as the following compounds; and from 0.1 to 5% as represented by mass percentage of an oxidant comprising at least one member selected from the group consisting of a nitrate compound, a sulfate compound, a peroxide, a perchlorate and chloric acid.

(Glass Material)
$P_2O_5$: from 30 to 55%,
$AlF_3$: from 5 to 15%,
at least one member selected from the group consisting of $MgF_2$, $CaF_2$, $SrF_2$ and $BaF_2$: from 1 to 50% in terms of the total amount of $MgF_2+CaF_2+SrF_2+BaF_2$,
$ZnF_2$: from 0 to 20%,
at least one member selected from the group consisting of LiF, NaF and KF: from 1 to 16% in terms of the total amount of LiF+NaF+KF,
CuO: from 5 to 14%, and
$Sb_2O_3$: from 0.1 to 3%,
here, up to 70% of the fluorides based on the total amount of the fluorides may be substituted by oxides.

Further, the present invention is characterized by a near infrared cut filter glass, which is produced by melting and forming a glass material blended as follows as represented by mass percentage calculated as the following compounds; and from 0.1 to 5% as represented by mass percentage of an oxidant comprising at least one member selected from the group consisting of a nitrate compound, a sulfate compound, a peroxide, a perchlorate and chloric acid.

(Glass Material)

P$_2$O$_5$: from 30 to 55%,

AlF$_3$: from 5 to 15%, at least one member selected from the group consisting of MgF$_2$, CaF$_2$, SrF$_2$ and BaF$_2$: from 1 to 50% in terms of the total amount of MgF$_2$+CaF$_2$+SrF$_2$+BaF$_2$, ZnF$_2$: from 0 to 20%, at least one member selected from the group consisting of LIE, NaF and KF: from 1 to 16% in terms of the total amount of LiF+NaF+KF, CuO: from 5 to 14%, and Sb$_2$O$_3$: from 0.1 to 3%, here, up to 70% of the fluorides based on the total amount of the fluorides may be substituted by oxides.

Further, the present invention is characterized by the above near infrared cut filter glass, wherein the glass plate after the melting and forming has an infrared-side wavelength of from 590 to 650 nm at which the transmittance becomes 50% and a transmittance of at least 84% at a wavelength of 400 nm, where the transmittances are values as calculated as those of a glass thickness of 0.15 mm.

Advantageous Effects of Invention

With the present invention, it is possible to produce a near infrared cut filter glass, which efficiently transmits light in a visible region of from 400 to 600 nm even when the glass contains a high concentration of CuO since Cu$^+$ ion concentration in the glass is controlled, and which is applicable to a thin plate having a thickness of at most about 0.15 mm.

BRIEF DESCRIPTION OF DRAWINGS

FIG. 1 is a view showing the spectral transmittance characteristics of a glass of an Example according to the present invention (Example 5) and a glass of Comparative Example (Example 12).

DESCRIPTION OF EMBODIMENTS

The process for producing a near infrared cut filter glass of the present invention solves the above problems by containing CuO necessary for near infrared cut characteristics in a glass, and controlling Cu$^+$ ion concentration produced from the CuO in the glass to be as low as possible.

CuO is present as Cu$^{2+}$ ions or Cu$^+$ ions in the glass. In the case of near infrared cut filter glass containing CuO, it is necessary to make most of copper ions in a state of Cu$^{2+}$ ions having a near infrared cutting characteristics. As a method for increasing Cu$^{2+}$ ions in the glass, a method of adding an oxidant in the glass material and thereby producing a oxidizing state in the melting atmosphere of glass to oxidize Cu$^+$ ions into Cu$^{2+}$ ion state. However, although the method of adding an oxidant to the glass material and melting them provides an effect of oxidizing Cu$^+$ ions by the effect of the oxidant to produce Cu$^{2+}$ ions in the initial stage of vitrification reaction, there occurs a phenomenon that the Cu$^{2+}$ ions return to Cu$^+$ ions with time of melting. This is because as the melting of the glass progresses, transition metals tend to shift toward low atomic valence side. Accordingly, it is not possible to obtain a sufficient effect of controlling Cu$^+$ ions by simply adding an oxidant to the glass material.

Under the circumstances, the present inventors have discovered that by making the glass material contain from 0.1 to 3% (mass %) of Sb$_2$O$_3$ and using it in combination with an oxidant, it is possible to control the ratio of Cu$^+$ ions in the glass to be as low as possible.

Sb$_2$O$_3$ is present as Sb$^{3+}$ ions or Sb$^{5+}$ ions in a glass, but by using Sb$_2$O$_3$ as a raw material, it is present also as Sb$^{3+}$ ions. When both of Sb$_2$O$_3$ and the oxidant are present in a molten glass, Sb$^{3+}$ ions are oxidized by the effect of the oxidant to be in a state of Sb$^{5+}$ ions. Further, since the Sb$^{5+}$ ions affect Cu$^+$ ions in the glass to change the Cu$^+$ ions into Cu$^{2+}$ ions and the state is maintained, it is possible to control the ratio of Cu$^+$ ions in the glass as low as possible. Here, it is necessary that the Sb$^{3+}$ ions become Sb$^{5+}$ ions in order to develop an effect of changing Cu$^+$ ions into Cu$^{2+}$ ions. Accordingly, in the present invention, it is essential that Sb$_2$O$_3$ and an oxidant are used in combination.

The reason of limiting the effect and the content (represented by mass %) of components constituting the glass material of a glass to be obtained in the present invention, will be described.

P$_2$O$_5$ is the main component to form the network structure of glass, and if the content is less than 30%, it becomes difficult to contain a high concentration of CuO, whereby the glass tends to be devitrificated. If the content exceeds 55%, the chemical durability decreases and weathering in a long time use may be caused. The preferred range is from 35 to 45%.

AlF$_3$ is a component to improve the chemical durability of glass and to increase the viscosity of glass, but if the content is less than 5%, such an effect cannot be obtained, and if it exceeds 15%, vitrification tends to be difficult. The preferred range is from 8 to 12%.

At least one type of alkaline earth metal fluoride selected from the group consisting of MgF$_2$, CaF$_2$, SrF$_2$ and BaF$_2$ is contained. MgF$_2$, CaF$_2$, SrF$_2$ and BaF$_2$ are effective for stabilizing the glass without lowering the chemical durability, but if the total content is less than 1%, vitrification tends to be difficult, and if it exceeds 50%, vitrification tends to be unstable and devitrification may be caused, such being not preferred. The preferred range is from 10 to 40%.

ZnF$_2$ is a component to improve the chemical durability of glass, and if the content exceeds 20%, the glass tends to be unstable. The content is preferably at most 15%.

At least one type of alkaline metal fluoride selected from the group consisting of LiF, NaF and KF is contained. LiF, NaF and KF are components effective for lowering the melting temperature of glass, but they also lower the chemical durability of glass. If the total content is less than 1%, the melting temperature becomes too high, and if it exceeds 16%, the chemical durability becomes poor. The preferred range is from 5 to 12%.

It is possible to substitute up to 70% of the total amount of the fluorides among the above components by oxides, but if the amount of substitution exceeds 70%, objective spectral characteristics or weather resistance cannot be obtained.

CuO is an essential component for near infrared cutting, but if the content is less than 5%, near infrared cutting effect is insufficient, and if it exceeds 14%, the glass tends to be unstable. The preferred range is from 8 to 12%.

Sb$_2$O$_3$ is, as described above, a component which becomes in Sb$^{5+}$ ion state by the effect of the oxidant used in combination with Sb$_2$O$_3$ in the production of near infrared cut filter glass, and oxidizes Cu$^+$ ions into Cu$^{2+}$ ions thereby to control the ratio of Cu$^+$ ions in the glass to be as low as possible to increase the spectral transmittance in the visible region of from 400 to 600 nm. If the content of Sb$_2$O$_3$ is less than 0.1%, its effect is not exhibited, but if it exceeds 3%, the glass tends to be unstable and devitrification tends to occur. The preferred range is from 0.3 to 2%.

The oxidant in an amount of from 0.1 to 5 mass % based on the total amount of the glass material and the oxidant input for production, is added. Such an oxidant is an essential component to oxidize $Sb^{3+}$ ions into $Sb^{5+}$ ions as described above. If the content is less than 0.1%, its effect is not obtained, but if it exceeds 5%, the glass tends to be unstable and devitrification tends to occur. The preferred range is from 0.3 to 3%. As the oxidant, at least one member selected from the group consisting of a nitrate compound, a sulfate compound, a peroxide, a perchlorate and chloric acid, which contains the same type of cations as cations contained in the glass composition to be obtained.

A specific example of preferred oxidant may, for example, be $LiNO_3$, $KClO_4$, $NaClO_3$, $MgSO_4$, $BaO_2$, $NaNO_3$, $KNO_3$ or $Na_2SO_4$.

A near infrared cut filter glass to be obtained by the production process of the present invention preferably has such a spectral characteristic that when the plate thickness is 0.15 mm, that is as converted as the value of a plate thickness of 0.15 mm, the infrared side wavelength at which the transmittance becomes 50% (λ50%) is from 590 to 650 nm. Further, the transmittance at a wavelength of 400 nm is preferably at least 84%, more preferably at least 86%. Further, it is particularly preferred that the infrared side wavelength at which the transmittance becomes 50% (λ50%) is from 600 to 630 nm and that the transmittance at a wavelength of 400 nm is at least 86%. With these characteristics, a glass having good transmitting characteristics as a near infrared cut filter is obtained.

In an absorption type near infrared cut filter glass, the infrared side wavelength at which the transmittance becomes 50% tends to shift to longer wavelength side as the plate thickness becomes thinner. Further, considering sensitivity characteristics of a solid state image-capturing element such as CCD or CMOS, the infrared side wavelength at which the transmittance becomes 50% (λ50%) is preferably from 590 to 650 nm.

Heretofore, when a near infrared cut filter glass contains a high concentration of CuO, it has been difficult to satisfy both the cutting characteristic in near infrared region (infrared side wavelength at which the transmittance becomes 50%) and the transmittance at a wavelength of 400 nm. On the other hand, in the near infrared cut filter glass of the present invention, the glass contains a high concentration of CuO to lower the transmittance in near infrared region, thereby to suppress shifting of the infrared side wavelength at which the transmittance becomes 50% to the longer wavelength side caused by reduction of the plate thickness. Further, the problem that the high concentration of CuO contained in the glass causes to increase the amount and ratio of $Cu^+$ ions in the glass to lower the spectral transmittance in the visible region of from 400 to 500 nm, is suppressed by using the specific amount of $Sb_2O_3$ in combination with the oxidant in the glass material, and a transmittance of at least 84% at a wavelength of 400 nm is achieved.

In the present invention, the melting temperature of the blend of the glass material and the oxidant is preferably from 750 to 1,000° C., more preferably from 850 to 950° C.

As a method for forming a glass plate, a method of casting a molten glass in a mold and cooling or various types of other commonly used forming methods of glass plate may be employed.

The near infrared cut filter glass of the present invention can be produced as follows. First, raw materials are weighed and mixed so that the composition of the glass is within the above composition range. The raw material mixture is put in a platinum crucible, capped and heated at a temperature of from 750 to 1,000° C. in an electric furnace to melt the raw material mixture. It is sufficiently stirred and refined, and thereafter, casted in a mold and annealed. Thereafter, it is cut and polished to produce a plate of for example a size of 50 mm×200 mm×2 mm thick. The plate is disposed in a stretching apparatus, heated to the vicinity of softening point and stretched to produce a thin plate having a thickness of 0.15 mm.

EXAMPLES

Now, the present invention will be specifically described with reference to Examples, but the technical scope of the present invention is by no means limited to these Examples.

Various types of glass materials were weighed and mixed according to the mass percentage values as calculated as those of compounds of Tables 1 and 2. The raw material mixture was put in a platinum crucible, capped and heated at a temperature of 900° C. in an electric furnace. It was sufficiently stirred and refined, and thereafter, casted in a mold and annealed. Thereafter, it was cut and polished to produce a plate having a size of 50 mm×200 mm×2 mm thick. The plate was disposed in a stretching apparatus, heated to the vicinity of softening point and stretched to produce a thin plate having a thickness of 0.15 mm.

Examples of the present invention and Comparative Examples are shown in Tables 1 and 2. Here, Examples 1 to 10 are Examples of the present invention, and Examples 11 to 15 are Comparative Examples. The amounts of glass materials and oxidants in the Tables are shown in mass %. The infrared side wavelength at which the transmittance becomes 50% (λ50%) and the transmittance were obtained by employing an UV-IR spectrophotometer V-570 manufactured by JASCO Corporation, and measuring spectral transmittance curve of bare glass (plate thickness: 0.15 mm) in which e.g. no anti-reflective film is coated. FIG. 1 shows spectral transmittance curves of glasses of Example 5 (Example of the present invention) and Example 12 (Comparative Example).

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Glass component | $P_2O_5$ | 31.3 | 42.1 | 34.8 | 42.7 | 40.6 | 41.5 | 37.0 | 44.5 |
|  | $AlF_3$ | 14.8 | 8.1 | 5.4 | 10.1 | 12.0 | 7.7 | 10.8 | 11.7 |
|  | LiF | 4.3 |  | 3.2 | 9.7 | 5.0 |  | 8.7 | 7.9 |
|  | NaF |  | 13.1 | 2.6 |  | 4.0 | 3.2 |  |  |
|  | KF |  | 0.5 | 1.0 | 1.8 |  | 11.1 |  |  |
|  | $MgF_2$ | 5.0 |  | 17.2 | 11.8 | 1.1 |  | 5.5 | 4.1 |
|  | $CaF_2$ | 8.1 | 7.2 |  | 3.7 | 9.5 |  | 3.9 | 1.6 |
|  | $SrF_2$ | 2.2 | 10.5 | 8.5 | 2.2 | 4.8 |  |  |  |
|  | $BaF_2$ | 16.9 | 9.5 | 17.8 | 1.3 | 10.8 | 2.4 |  | 10.2 |
|  | $ZnF_2$ | 12.0 |  |  | 3.1 |  | 19.4 | 18.3 |  |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
|  | $Li_2O$ |  | 1.6 |  |  |  |  |  |  |
|  | MgO |  |  |  | 3.2 |  |  |  |  |
|  | CaO |  |  |  |  |  |  |  |  |
|  | CuO | 5.1 | 6.5 | 7.8 | 8.6 | 9.5 | 10.8 | 11.5 | 12.1 |
|  | $Sb_2O_3$ | 0.1 | 0.5 | 1.0 | 0.8 | 1.2 | 2.2 | 1.8 | 2.9 |
| oxidant | $LiNO_3$ |  |  |  | 0.7 |  | 1.5 |  |  |
|  | $KClO_4$ | 0.2 |  |  | 1.0 |  | 1.7 |  |  |
|  | $NaClO_3$ |  | 0.4 |  |  |  |  | 2.5 |  |
|  | $MgSO_4$ |  |  |  |  |  |  |  | 5.0 |
|  | $BaO_2$ |  |  |  |  |  |  |  |  |
|  | Total | 100.0 | 100.0 | 100.0 | 100.0 | 100.0 | 100.0 | 100.0 | 100.0 |
|  | λ50% (nm) | 638 | 632 | 625 | 620 | 615 | 608 | 604 | 600 |
|  | Transmittance (%) at 400 nm | 89.0 | 88.4 | 88.5 | 88.0 | 87.1 | 86.8 | 86.5 | 85.9 |

TABLE 2

|  |  | Ex. 9 | Ex. 10 | Ex. 11 | Ex. 12 | Ex. 13 | Ex. 14 | Ex. 15 |
|---|---|---|---|---|---|---|---|---|
| Glass component | $P_2O_5$ | 49.1 | 52.0 | 42.6 | 40.6 | 40.6 | 40.6 | 51.5 |
|  | $AlF_3$ | 6.8 | 9.6 | 7.6 | 12.0 | 12.0 | 12.0 | 10.0 |
|  | LiF | 2.2 |  |  | 6.5 | 6.5 | 6.5 |  |
|  | NaF | 5.6 | 10.0 | 14.2 | 4.0 | 4.0 | 4.0 | 11.2 |
|  | KF |  |  |  | 1.2 |  |  |  |
|  | $MgF_2$ | 13.3 |  |  | 1.1 | 1.1 | 1.1 |  |
|  | $CaF_2$ |  |  | 7.5 | 9.5 | 9.5 | 9.5 |  |
|  | $SrF_2$ | 4.2 | 0.9 | 9.9 | 4.8 | 4.8 | 4.8 | 1.0 |
|  | $BaF_2$ | 1.0 | 5.3 | 11.7 | 10.8 | 10.8 | 10.8 | 10.2 |
|  | $ZnF_2$ |  |  |  |  |  |  |  |
|  | $Li_2O$ |  |  |  |  |  |  |  |
|  | MgO | 0.5 |  |  |  |  |  |  |
|  | CaO |  | 2.7 |  |  |  |  | 2.4 |
|  | CuO | 12.8 | 13.7 | 6.5 | 9.5 | 9.5 | 9.5 | 13.7 |
|  | $Sb_2O_3$ | 2.5 | 2.0 |  |  | 1.2 |  |  |
| oxidant | $LiNO_3$ |  |  |  |  |  | 1.2 |  |
|  | $KClO_4$ |  |  |  |  |  |  |  |
|  | $NaClO_3$ | 2.0 |  |  |  |  |  |  |
|  | $MgSO_4$ |  |  |  |  |  |  |  |
|  | $BaO_2$ |  | 3.8 |  |  |  |  |  |
|  | Total | 100.0 | 100.0 | 100.0 | 100.0 | 100.0 | 100.0 | 100.0 |
|  | λ50% (nm) | 596 | 591 | 632 | 615 | 615 | 615 | 591 |
|  | Transmittance (%) at 400 nm | 85.2 | 84.7 | 81.5 | 71.2 | 71.4 | 71.2 | 48.2 |

From Tables 1 and 2, when Example 5 (Example of the present invention), Example 12 (Comparative Example), Example 13 (Comparative Example) and Example 14 (Comparative Example), that are the same in the content of CuO in the glass, are compared, the transmittance at a wavelength of 400 nm in Example 12 containing none of $Sb_2O_3$ and oxidant is lower than that of Example 5 containing $Sb_2O_3$ and oxidant. Further, in Example 13 that is different from Example 12 only in that Example 13 contains $Sb_2O_3$, the transmittance at a wavelength of 400 nm is low like Example 12. Further, in Example 14 that is different from Example 12 only in that it contains an oxidant ($LiNO_3$), the transmittance at a wavelength of 400 nm is low like Example 12. From these results, it is understandable that it is not possible to obtain an effect of increasing the transmittance in the visible region by simply making the glass material contain $Sb_2O_3$ without adding an oxidant, or by simply adding an oxidant without making the glass raw material contain $Sb_2O_3$. On the other hand, like the glasses of Examples 1 to 10, a glass produced by adding an oxidant and making the glass material contain $Sb_2O_3$ so that both of $Sb_2O_3$ and the oxidant are present in molten glass, have higher transmittances at a wavelength of 400 nm as compared with glasses of Comparative Examples.

INDUSTRIAL APPLICABILITY

As described above, the near infrared cut filter glass of the present invention efficiently transmits light in a wavelength region of from 400 to 600 nm even when the glass contains a high concentration of CuO, and accordingly, it is extremely useful as a near infrared cut filter glass applicable to a thin plate having a thickness of at most about 0.15 mm.

This application is a continuation of PCT Application No. PCT/JP2011/057225, filed on Mar. 24, 2011, which is based upon and claims the benefit of priority from Japanese Patent Application No. 2010-072449 filed on Mar. 26, 2010. The contents of those applications are incorporated herein by reference in its entirety.

What is claimed is:

1. A process for producing a near infrared cut filter glass, the process comprising:

mixing a glass material and an oxidant for oxidizing Sb, thereby obtaining a raw material mixture; and melting the raw material mixture, thereby obtaining the near infrared cut filter glass, wherein:

the glass material comprises, by mass based on a total amount of the raw material mixture:

$P_2O_5$: from 30 to 55%, $AlF_3$: from 5 to 15%, at least one alkaline earth metal fluoride selected from the group consisting of $MgF_2$, $CaF_2$, $SrF_2$ and $BaF_2$: from 1 to 50% in terms of a total amount of $MgF_2$+$CaF_2$+$SrF_2$+$BaF_2$, $ZnF_2$: from 0 to 20%, at least one alkaline metal fluoride selected from the group consisting of LiF, NaF and KF: from 1 to 16% in terms of a total amount of LiF+NaF+KF, CuO: from 5 to 14%, and $Sb_2O_3$: from 0.1 to 3%;

up to 70% of fluorides based on a total amount of the fluorides in the glass material are optionally substituted by oxides;

the oxidant for oxidizing Sb is in an amount of from 0.1 to 5% by mass based on the total amount of the raw material mixture; and the oxidant for oxidizing Sb comprises at least one compound selected from the group consisting of a nitrate compound, a sulfate compound, a peroxide, a perchlorate and chloric acid.

2. The process according to claim 1, wherein the glass material comprises $P_2O_5$ of from 35 to 45% by mass based on the total amount of the raw material mixture.

3. The process according to claim 1, wherein the glass material comprises $AlF_3$ of from 8 to 12% by mass based on the total amount of the raw material mixture.

4. The process according to claim 1, wherein the glass material comprises the at least one alkaline earth metal fluoride of from 10 to 40% by mass based on the total amount of the raw material mixture.

5. The process according to claim 1, wherein the glass material comprises $ZnF_2$ of from 0 to 15% by mass based on the total amount of the raw material mixture.

6. The process according to claim 1, wherein the glass material comprises the at least one alkaline metal fluoride of from 5 to 12% by mass based on the total amount of the raw material mixture.

7. The process according to claim 1, wherein the glass material comprises CuO of from 8 to 12% by mass based on the total amount of the raw material mixture.

8. The process according to claim 1, wherein the glass material comprises $Sb_2O_3$ of from 0.3 to 2% by mass based on the total amount of the raw material mixture.

9. The process according to claim 1, wherein the oxide for oxidizing Sb is in an amount of from 0.3 to 3% by mass based on the total amount of the raw material mixture.

10. The process according to claim 1, wherein the near infrared cut filter glass has a transmittance of 50% at an infrared-side wavelength of from 590 to 650 nm and a transmittance of at least 84% at a wavelength of 400 nm, and the transmittances are calculated as transmittances of a glass plate with a thickness of 0.15 mm.

11. The process according to claim 1, wherein said melting occurs at a temperature of from 750 to 1,000° C.

12. The process according to claim 1, wherein the oxidant for oxidizing Sb is at least one selected from the group consisting of $LiNO_3$, $KClO_4$, $NaClO_3$, $MgSO_4$, $BaO_2$, $NaNO_3$, $KNO_3$ and $Na_2SO_4$.

13. A near infrared cut filter glass produced by a process comprising:

mixing a glass material and an oxidant for oxidizing Sb, thereby obtaining a raw material mixture; and melting the raw material mixture, thereby obtaining the near infrared cut filter glass, wherein:

the glass material comprises, by mass based on a total amount of the raw material mixture:

$P_2O_5$: from 30 to 55%, $AlF_3$: from 5 to 15%, at least one alkaline earth metal fluoride selected from the group consisting of $MgF_2$, $CaF_2$, $SrF_2$ and $BaF_2$: from 1 to 50% in terms of a total amount of $MgF_2$+$CaF_2$+$SrF_2$+$BaF_2$, $ZnF_2$: from 0 to 20%, at least one alkaline metal fluoride selected from the group consisting of LiF, NaF and KF: from 1 to 16% in terms of a total amount of LiF+NaF+KF, CuO: from 5 to 14%, and $Sb_2O_3$: from 0.1 to 3%;

up to 70% of fluorides based on a total amount of the fluorides in the glass material are optionally substituted by oxides;

the oxidant for oxidizing Sb is in an amount of from 0.1 to 5% by mass based on the total amount of the raw material mixture; and the oxidant for oxidizing Sb comprises at least one compound selected from the group consisting of a nitrate compound, a sulfate compound, a peroxide, a perchlorate and chloric acid.

14. The near infrared cut filter glass according to claim 13, wherein the near infrared cut filter glass has a transmittance of 50% at an infrared-side wavelength of from 590 to 650 nm and a transmittance of at least 84% at a wavelength of 400 nm, and the transmittances are calculated as transmittances of a glass plate with a thickness of 0.15 mm.

15. The process according to claim 13, wherein the oxidant for oxidizing Sb is at least one selected from the group consisting of $LiNO_3$, $KClO_4$, $NaClO_3$, $MgSO_4$, $BaO_2$, $NaNO_3$, $KNO_3$ and $Na_2SO_4$.

* * * * *